United States Patent
Shin et al.

(10) Patent No.: US 6,560,100 B1
(45) Date of Patent: *May 6, 2003

(54) PORTABLE COMPUTER EQUIPPED WITH ADD-ON BATTERY

(75) Inventors: Takahiro Shin; Masuo Ohnishi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,441

(22) Filed: Apr. 16, 1997

(30) Foreign Application Priority Data

Oct. 24, 1996 (JP) .............................................. 8-282399

(51) Int. Cl.⁷ .............................. G06F 1/16; H05K 5/02
(52) U.S. Cl. ......................................... 361/686; 429/96
(58) Field of Search ................................ 361/683, 686; 364/708.1; 307/150; 429/96–100, 123; G06F 1/16

(56) References Cited

U.S. PATENT DOCUMENTS

| 4,680,674 A | 7/1987 | Moore |
| 4,858,162 A | 8/1989 | Kieffer et al. .............. 364/708 |

(List continued on next page.)

FOREIGN PATENT DOCUMENTS

| EP | 0 838 750 A1 | 4/1988 |
| EP | 0 448 053 | 9/1991 |

(List continued on next page.)

OTHER PUBLICATIONS

"Mobile PC"; Mar. 1996; pp. 102–103.
"ASCII DOS/V ISSUE"; Aug. 1996; p. 210.
"ASCII DOS/ V ISSUE"; Sep. 1996; p. 139.
"ASCII"; Jun., 1996; pp. 330–331.
"Mobile PC"; Jul., 1996; pp. 86–87.
"Mobile PC"; Jun., 1996; vol. 2, No. 6, pp. 25–29.
"ASCII"; May, 1996; vol. 20.
Patent Abstracts of Japan, vol. 19, JP 06 043965 A (Hitachi LTD), Feb. 18, 1994.
European Search Report, Ref. No. 97304759.0–2212–, dated Feb. 17, 1998.
Patent Abstracts of Japan, vol. 18, No. 273 (P–1742), May 24, 1994 & JP 06 043965 A (Hitachi LTD), Feb. 18, 1994.
Patent Abstracts of Japan, vol. 96, No. 7, Jul. 31, 1996 & JP 08 076879 A (Citizen Watch Co LTD), Mar. 22, 1996.
"Integral Distributed Battery Pack for Portable Systems," Research Disclosure, No. 333, Jan. 1, 1992, p. 12 (XP000281124).

(List continued on next page.)

Primary Examiner—Lynn D. Feild
(74) Attorney, Agent, or Firm—Staas & Halsey LLP

(57) ABSTRACT

A portable computer includes a portable computer body having an upper surface, a lower surface and a lower front edge thereof. An add-on battery is detachably mounted on the lower surface of the portable computer body and has a wedge-shaped portion corresponding to a wedge-like space which is defined between the lower surface of the portable computer body and a surface on which the portable computer body is placed, when the portable computer body is placed to be inclined about the lower front edge of the portable computer body. The portable computer body is, when it is equipped with the add-on battery, inclined in such a manner that the upper surface of the portable computer body is lower at a front edge thereof.

18 Claims, 7 Drawing Sheets

U.S. PATENT DOCUMENTS

| | | | |
|---|---|---|---|
| 4,893,263 A | 1/1990 | Myers | |
| 4,926,365 A | 5/1990 | Hsieh | |
| 4,958,889 A | 9/1990 | Boyle et al. | |
| 4,978,949 A | 12/1990 | Herron et al. | |
| 4,991,058 A | 2/1991 | Watkins et al. | |
| 5,030,128 A | 7/1991 | Herron et al. | |
| 5,126,954 A | 6/1992 | Morita | |
| 5,153,817 A | 10/1992 | Hosoi et al. | |
| 5,182,699 A | 1/1993 | Kobayashi et al. | |
| 5,186,646 A | 2/1993 | Pederson | |
| 5,187,645 A | 2/1993 | Spalding et al. | |
| 5,196,993 A | 3/1993 | Herron et al. | |
| 5,217,394 A | 6/1993 | Ho | |
| 5,265,238 A | 11/1993 | Canova, Jr. et al. | |
| 5,278,730 A | 1/1994 | Kikinis | |
| 5,290,178 A | 3/1994 | Ma | |
| 5,293,300 A | 3/1994 | Leung | |
| 5,301,334 A | 4/1994 | Horiuchi | |
| 5,311,397 A | 5/1994 | Harshberger et al. | |
| 5,400,055 A | 3/1995 | Ma et al. | |
| 5,410,712 A | 4/1995 | Okuno | |
| 5,411,416 A | 5/1995 | Balon et al. | |
| 5,428,798 A | 6/1995 | Sekine et al. | |
| 5,430,883 A | 7/1995 | Horiuchi | |
| 5,440,748 A | 8/1995 | Sekine et al. | |
| 5,459,637 A | 10/1995 | Ma et al. | |
| 5,460,547 A | 10/1995 | Belt et al. | |
| 5,473,506 A | 12/1995 | Kikinis | |
| 5,475,271 A | 12/1995 | Shibasaki et al. | |
| 5,478,253 A | 12/1995 | Biechler et al. | |
| 5,506,749 A | * 4/1996 | Matsuda | 361/683 |
| 5,522,089 A | 5/1996 | Kikinis | |
| 5,552,089 A | 9/1996 | Kikinis et al. | |
| 5,557,562 A | 9/1996 | Yoshiharu et al. | 364/708.1 |
| 5,567,180 A | 10/1996 | Seo | |
| 5,583,744 A | 12/1996 | Oguchi et al. | 361/683 |
| 5,594,617 A | * 1/1997 | Foster et al. | 361/679 |
| 5,641,588 A | * 6/1997 | Sieminski et al. | 429/98 |
| 5,677,827 A | * 10/1997 | Yoshioka et al. | 361/683 |
| 5,680,625 A | 10/1997 | Sekine et al. | |
| 5,729,478 A | 3/1998 | Ma et al. | |
| 5,764,477 A | 6/1998 | Ohgami et al. | |
| 5,768,100 A | 6/1998 | Barrus et al. | |
| 5,930,517 A | 7/1999 | Diehl et al. | |
| 5,986,991 A | 11/1999 | Kawahara et al. | |
| 6,078,496 A | 6/2000 | Oguchi et al. | |

FOREIGN PATENT DOCUMENTS

| | | |
|---|---|---|
| EP | 0 618 525 | 10/1994 |
| JP | 58-33735 | 2/1983 |
| JP | 63-8960 | 1/1988 |
| JP | 63-55655 | 3/1988 |
| JP | 2-73224 | 6/1990 |
| JP | 2-287719 | 11/1990 |
| JP | 3-171312 | 7/1991 |
| JP | 3-223915 | 10/1991 |
| JP | 3-269608 | 12/1991 |
| JP | 3-294917 | 12/1991 |
| JP | 4-617 | 1/1992 |
| JP | 4-10015 | 1/1992 |
| JP | 4-10017 | 1/1992 |
| JP | 4-18617 | 1/1992 |
| JP | 4-077809 | 3/1992 |
| JP | 4-44026 | 4/1992 |
| JP | 4-101207 | 4/1992 |
| JP | 4-101258 | 4/1992 |
| JP | 4-151704 | 5/1992 |
| JP | 4-155417 | 5/1992 |
| JP | 4-155419 | 5/1992 |
| JP | 4-167012 | 6/1992 |
| JP | 4-195507 | 7/1992 |
| JP | 4-205328 | 7/1992 |
| JP | 4-211815 | 8/1992 |
| JP | 4-233174 | 8/1992 |
| JP | 4-108218 | 9/1992 |
| JP | 4-115753 | 10/1992 |
| JP | 4-505816 | 10/1992 |
| JP | 4-136721 | 12/1992 |
| JP | 5-23231 | 3/1993 |
| JP | 5-66858 | 3/1993 |
| JP | 5-66864 | 3/1993 |
| JP | 5-66867 | 3/1993 |
| JP | 5-33228 | 4/1993 |
| JP | 5-40917 | 6/1993 |
| JP | 5-225406 | 9/1993 |
| JP | 5-265591 | 10/1993 |
| JP | 5-274058 | 10/1993 |
| JP | 6-4692 | 1/1994 |
| JP | 6-35569 | 2/1994 |
| JP | 6-43965 | 2/1994 |
| JP | 6-138985 | 5/1994 |
| JP | 6-266479 | 9/1994 |
| JP | 7-56661 | 3/1995 |
| JP | 7-84689 | 3/1995 |
| JP | 7-94232 | 4/1995 |
| JP | 7-121518 | 5/1995 |
| JP | 8-007651 | 1/1996 |
| JP | 8-022437 | 1/1996 |
| JP | 8-076879 | 3/1996 |
| JP | 8-076887 | 3/1996 |
| JP | 8-076889 | 3/1996 |
| JP | 8-076898 | 3/1996 |
| JP | 8-106340 | 4/1996 |
| JP | 8-249242 | 9/1996 |
| JP | 9-62416 | 3/1997 |
| JP | 9-130659 | 5/1997 |
| JP | 9-190241 | 7/1997 |
| JP | 9-212260 | 8/1997 |
| JP | 9-275675 | 10/1997 |
| JP | 9-306451 | 11/1997 |
| JP | 10-84639 | 3/1998 |
| JP | 10-91292 | 4/1998 |
| JP | 10-91293 | 4/1998 |
| JP | 10-116133 | 5/1998 |
| JP | 10-124194 | 5/1998 |
| JP | 11-231969 | 8/1999 |
| WO | WO 90/10925 | 9/1990 |

OTHER PUBLICATIONS

Anthony, Robert S., "Desktop PCs still hold a power advantage over mobile units, but these notebooks offer all the power you'll need and more," *PC Magazine,* Jan. 23, 1996, pp. 101–103.

U.S. application No. 08/840,462, Kambayashi et al., filed Jun. 30, 1997.

U.S. application No. 08/885,857, Shin et al., filed Apr. 18, 1997.

\* cited by examiner

PORTABLE COMPUTER EQUIPPED WITH ADD-ON BATTERY

BACKGROUND OF THE INVENTION

1. Field of the Invention

This invention relates to a portable computer, such as a notebook type personal computer, a word processor, and so on. More specifically, this invention relates to a portable computer equipped with an add-on battery which can be removably fitted to the apparatus main body.

As portable computers have become widespread in recent years, improvements in portability, battery life and operability have been required. To improve operability, a keyboard must be inclined. To improve portability, the size and weight of the portable computer must be reduced. To prolong the life of the battery, the battery capacity must be increased. As one of the means for increasing the battery capacity, an add-on battery is removably fitted to the portable computer.

2. Description of Related Art

The prior art technology for tilting the key face of a portable computer includes a technology which fits a turn-down-type tilt stand to a personal computer. According to the turn-down-type tilt stand of this prior art, however, a useless space remains between the bottom surface of the portable computer and the desk surface on which the portable computer is put when the tilt stand is turned up. For example, Japanese Unexamined Patent Publication (Kokai) No. 8-76879 discloses a prior art technology which disposes an external memory device in such a space.

Prior art technologies which increase the battery life while improving portability include a method which fits an add-on battery device to the portable computer, whenever necessary. For example, Japanese Unexamined Patent Publication (Kokai) No. 8-76898 and No. 8-76887 disclose a structure capable of removably fitting a battery pack to a portable computer. However, such a portable computer is more bulky even when the add-on battery device is not fitted than those portable computers which have similar function but do not have the function of the add-on battery device.

One of the fitting technologies of the add-on battery prepares a groove and a rail so that the add-on battery device can be slidably fitted onto the portable computer. According to this fitting technology of the add-on battery, however, the add-on battery cannot be fitted easily once the groove undergoes deformation due to change with time.

Japanese Unexamined Patent Publication (Kokai) No. 8-76889 discloses a connection structure for an information processing apparatus in which connector shell portions for a pair of connectors are formed on the housing of an extended unit, the shell portions and the housing having formed thereon the shell portions are integrally molded from a resin material, and metal plating is applied to the entire surface.

As described above, when the tilt stand is turned up in the conventional portable computer equipped with the turn-down type tilt stand, a space remains between the bottom surface of the portable computer and the desk surface on which the portable computer is placed, and the space cannot be effectively utilized. In the conventional portable computer having a removable add-on battery, the size is greater than the portable computer having no add-on battery device function, and the portability is therefore lower.

According to the prior art technology capable of fitting the add-on battery in which the battery is fitted to the portable computer by the slide system using the groove and the rail, the add-on battery cannot be fitted easily to the portable computer, if the groove or the rail once undergoes deformation due to a change with time, and fitting becomes difficult in some cases.

SUMMARY OF THE INVENTION

It is therefore an object of the present invention to provide a portable computer which has good operability, is equipped with a removable add-on battery and has a portability equivalent to that of a portable computer having no add-on battery fitting function, though the add-on battery can be fitted.

Another object of the present invention is to provide a portable computer having an extended station which makes it possible to mount the portable computer thereon while the add-on battery is kept fitted to the personal computer main body.

According to the present invention, there is provided a portable computer equipped with an add-on battery, the computer comprising: a portable computer body having an upper surface, a lower surface and a lower front edge thereof; mounting means for detachably mounting the add-on battery on the lower surface of the portable computer body, the add-on battery having a wedge-shaped portion corresponding to a wedge-like space which is defined between the lower surface of the portable computer body and a surface on which the portable computer body is placed, when the portable computer body is placed to be inclined about the lower front edge of the portable computer body; and the portable computer body, when it is equipped with the add-on battery, being inclined in such a manner that the upper surface of the portable computer body is lower at a front edge thereof.

When the personal computer is placed on the desk surface, etc, while the add-on battery is added thereto, the upper surface of the computer main body on which the key top and operation surface are disposed is inclined so that its front side becomes lower. Therefore, operability becomes excellent. When the add-on battery is not fitted, the portable computer main body itself can be constituted into a thin notebook type. For this reason, even when the add-on battery can be fitted, the personal computer can be constituted into a thin and light-weight structure having portability equivalent to that of a portable personal computer not having the add-on battery fitting function.

The lower surface of the portable computer body has a rear region and the add-on battery has the wedge-shaped portion having a shape corresponding to the wedge-like space at least at the rear portion of the lower surface of the portable computer body. While the add-on battery is fitted, the space between the back of this portable computer and the desk surface, etc, can be effectively utilized, and a function having a high packaging density can be accomplished.

The mounting means comprises: guide means including L-shaped guide grooves along which the add-on battery is first guided toward the lower surface of the portable computer body and then guided forward with respect to the portable computer body; locking means for automatically locking the add-on battery to the lower surface of the portable computer body when the add-on battery is guided forward with respect to the portable computer body; and releasing means for releasing the locking means to allow the add-on battery to be removed from the portable computer body along the L-shaped guide grooves.

In this case, the portable computer body is provided at the lower surface thereof with pairs of left and right L-shaped guide grooves and the add-on battery has pairs of left and right pawls which can be fitted to the L-shaped guide grooves, respectively.

Accordingly, the add-on battery can be easily fitted and removed to and from the portable computer main body, and the add-on battery can be firmly fixed to the portable computer main body at the time of fitting.

According to another aspect of the present invention, there is provided a portable computer comprising: a portable computer body having an upper surface, a lower surface and a lower front edge thereof; an add-on battery detachably mounted on the lower surface of the portable computer body; and an extended station on which the portable computer body is detachably mounted, while the portable computer body is equipped with the add-on battery, the extended station having a recess or an opening for accommodating therein the add-on battery.

When the portable computer is mounted to the extended station while the add-on battery is kept fitted to the computer main body, the add-on battery is accommodated inside a recess portion (or an opening) in the extended station. Therefore, the overall space can be utilized effectively, and an apparatus having a high density can be accomplished. Even when the recess portion exists in the extended station, a printed wiring board, etc, can be disposed below this recess portion and consequently, the arrangement inside the extended station can be made efficiently.

DESCRIPTION OF THE PREFERRED EMBODIMENTS

Hereinafter, preferred embodiments of a portable computer according to the present invention will be explained in detail.

Figure 1:
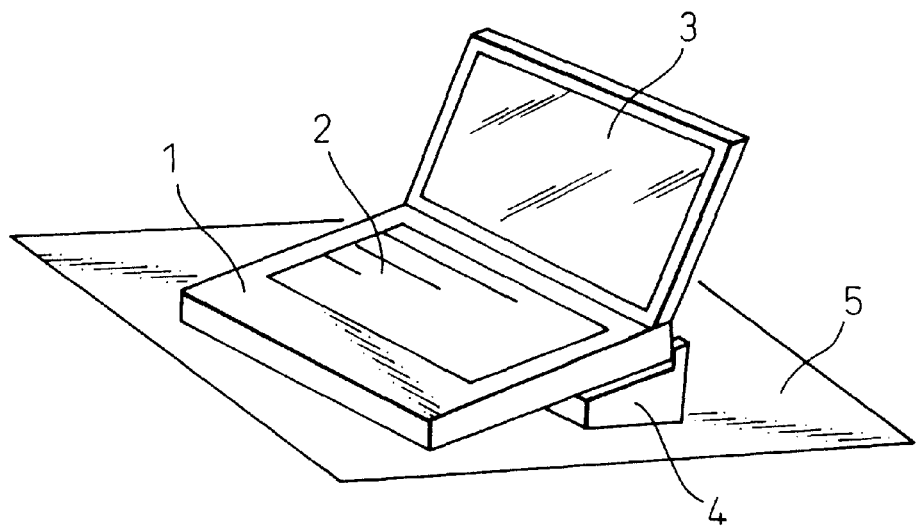
FIG. 1 is a perspective view showing a portable computer at a state where it is placed on a desk surface while an add-on battery is fitted to the portable computer main body.

FIG. 1 is a perspective view showing a state where a portable computer is placed on a desk surface 5 while an add-on battery 4 is fitted to the computer main body 1. As shown in the drawing, the add-on battery 4 is fitted to the bottom surface of the rear part of the portable computer main body 1, and when the battery 4 is fitted, the portable computer main body 1 is inclined with the lower surface of the distal end of the forward part of the main body being the axis. In consequence, the front part of the key top 2 is lower while its rear part is higher, and the input operation by the keyboard 2 becomes easy.

The add-on battery 4 has a wedge-like shape in a longitudinal direction in such a manner as to fill the space between the bottom surface of the portable computer 1 and the surface 5 on which it is placed. Therefore, under a state where the add-on battery 4 is fitted to the portable computer 1, the total capacity of the portable computer having the add-on battery fitted thereto is increased by a capacity which is approximately equal to the capacity of the add-on battery 4 and the space between the bottom surface of the portable computer 1 and the surface 5 on which this portable computer 1 is placed does not become a useless space but can be utilized effectively. Under the state where the add-on battery 4 is removed from the portable computer main body 1, on the other hand, the total capacity is reduced by a capacity approximately equal to the capacity of the add-on battery 4 in comparison to the case where it is fitted.

Figure 2:
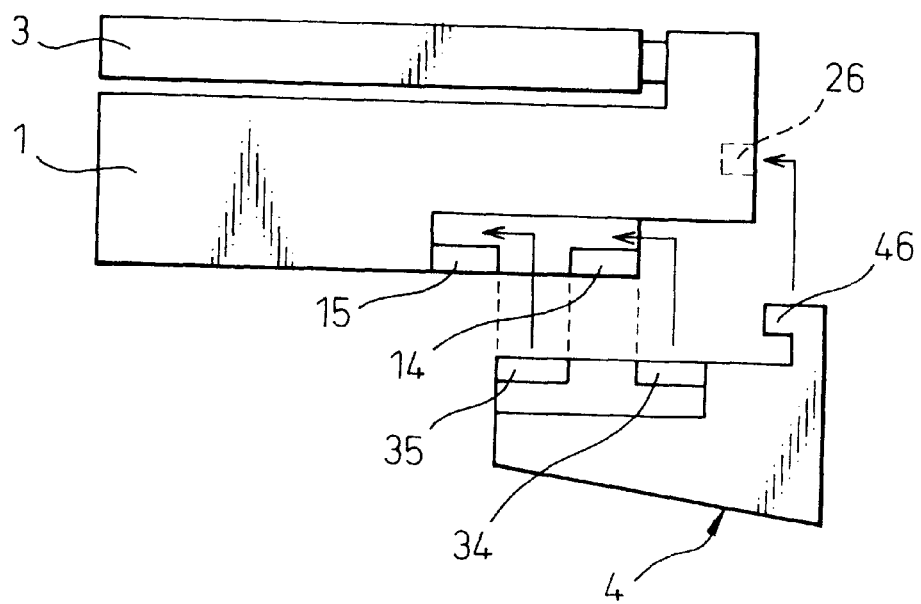
FIG. 2 is a schematic side view showing the fitting and removing state of the add-on battery to and from the portable computer main body 1.
Figure 3:
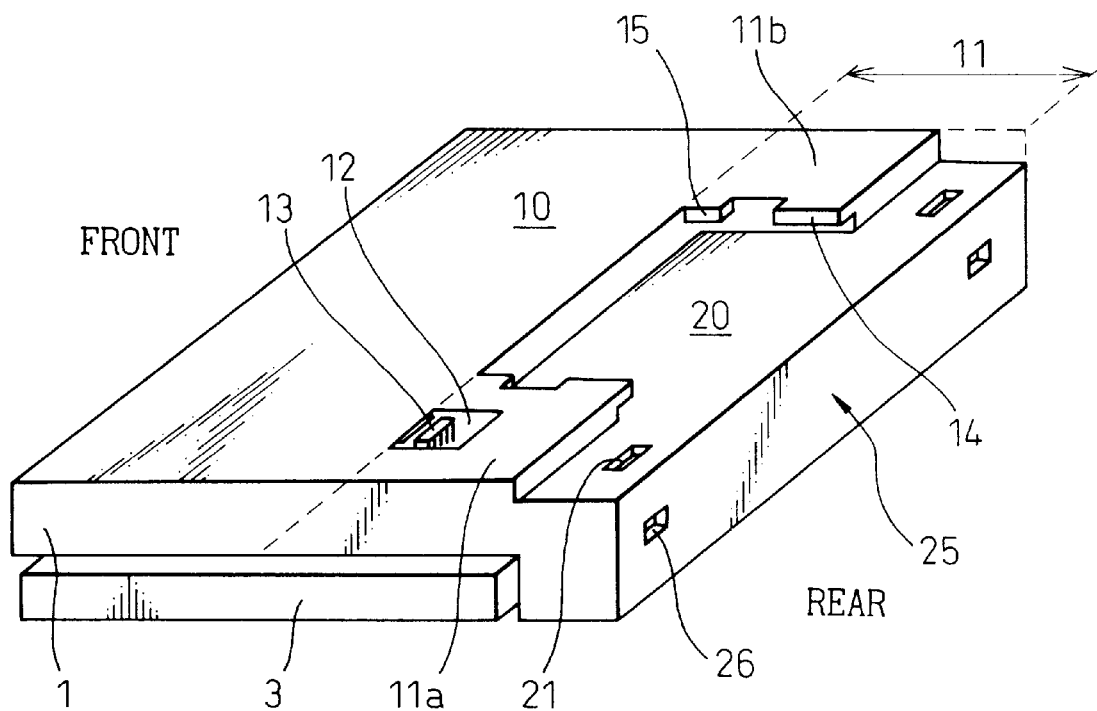
FIG. 3 is a perspective view when the portable computer main body is viewed with its bottom surface facing up.
Figure 4:
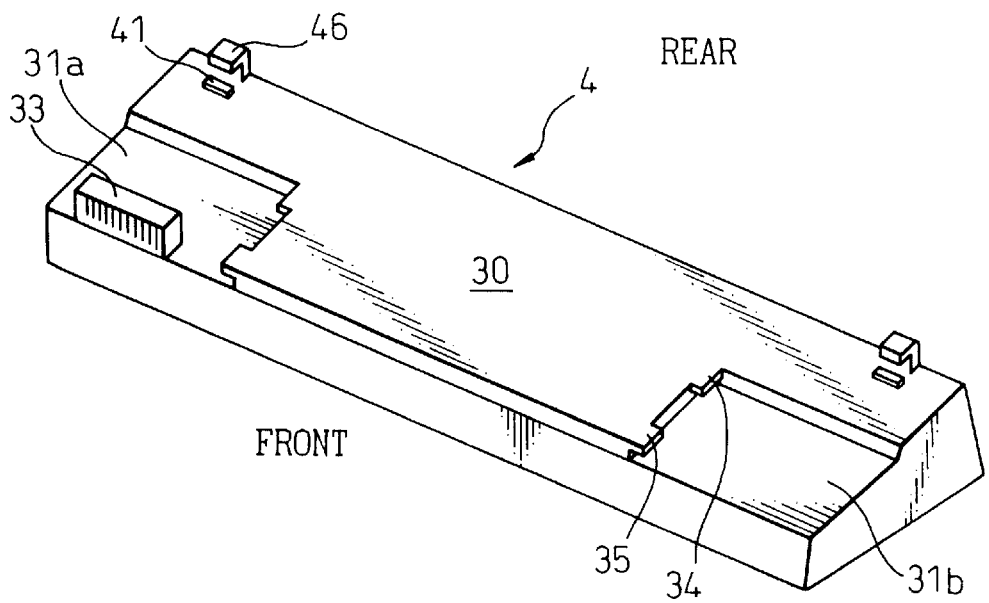
FIG. 4 is a perspective view of the add-on battery.

FIG. 2 is a schematic side view showing the fitting/removing state of the add-on battery to and from the portable computer main body 1. FIG. 3 is a perspective view showing the portable computer main body with its bottom facing up, and FIG. 4 is a perspective view of the add-on battery.

In FIG. 3, a rear area 11 of the bottom surface 10 of the portable computer main body 1 is defined as a fitting/removing area of the add-on battery 4. A recess portion 12 for disposing a power connector is formed inside the add-on battery fitting/removing area 11 (for example, inside an area 11a), and another power connector 13 is disposed on the internal front side of this recess portion 12. By the way, a sliding cover is provided to the recess portion 12. When no add-on battery 4 is fitted, the recess portion 12 is closed and no power connector 13 inside the recess portion 12 can be seen from outside.

The add-on battery fitting/removing area 11 is a recessed area 10 recessed from the bottom surface 10 of the portable computer main body 1 at portions other than both sides and front areas 11a and 11b. Two pairs of pawls 14 and 15 are formed between the center portion of the recessed area and both side areas 11a and 11b, respectively. A pair of recesses 21 are formed on both sides of the recessed area 20 for locking the add-on battery 4.

A pair of escape holes 26 for locking are further disposed on both sides of the rear surface 25 of the portable computer main body 1.

Referring now to FIG. 4, the add-on battery 4 includes a surface 30 which comes into contact with the recessed surface, which is recessed from the bottom surface 10 of the portable computer main body 1, when the battery is fitted to the main body 1, and a pair of recessed surfaces 31a and 31b which are formed at front positions on both sides of this surface 30 and correspond to the areas 11a and 11b of the portable computer main body 1, respectively.

A power supply connector 32 is disposed on one recessed surface 31a in such a manner as to correspond to the power connector 13 of the portable computer main body 1 when the add-on battery 4 is fitted to the portable computer main body 1.

Two pairs of pawls 34 and 35 which correspond to the two pairs of pawls 14 and 15 on the side of the portable computer main body 1 are disposed between an area at the back of the center portion of the surface 30 of the add-on battery 4 and the pair of recessed surfaces 31a and 31b, respectively.

A pair of lock pawls 41 are disposed on both sides at the rear part of the surface 30 in such a manner as to correspond to the pair of lock recesses 21 of the portable computer main body 1. As will be later described, these lock pawls are normally biased in a projecting direction, though they can be compressed against the spring.

Furthermore, a pair of projecting pawls 46 that have an L-shaped section and protrude forward are disposed at the positions of the rear end portion of the add-on battery 4 at the back of the pair of lock pawls 41 in such a manner as to correspond to the positions of the pair of escape holes 26 for locking.

Next, the fitting operation of the add-on battery 4 to the portable computer main body 1 will now be explained. First, the main power switch (not shown) of the portable computer main body 1 is turned OFF, and any other external power source, such as an AC adaptor (not shown), is removed from the main body 1, if it has been connected to the portable computer main body 1, as is customary in the art.

The cover (not shown) of the recess 12 on the back of the portable computer main body 1 is opened, and the add-on battery 4 is moved towards the back of the portable computer main body 1 and fitted so that the power connector 33 of the add-on battery 4 can be fitted into the recess 12 of the portable computer main body 1. At this time, the pawls 34 and 35 of the add-on battery 4 are passed through the gap between the pawls 14 and 15 of the portable computer main body 1 and through the back side of the pawl 14, whereby the state shown in FIG. 7 can be attained.

Figure 7:
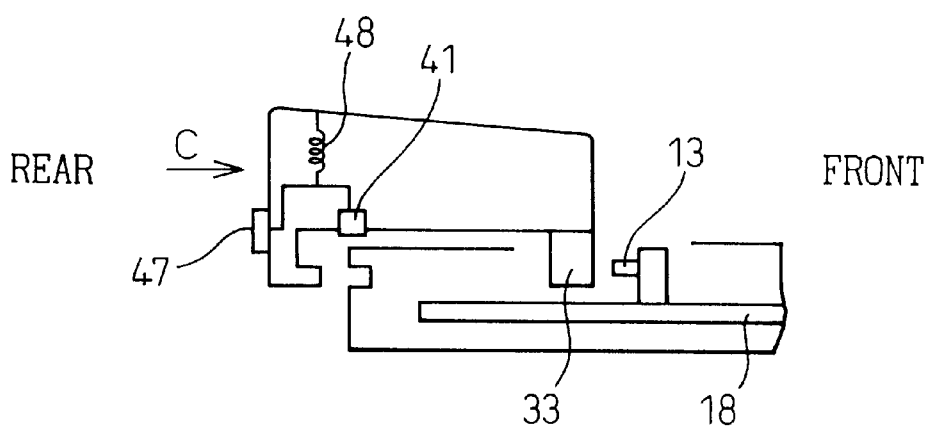
FIG. 7 is a sectional view showing a state when the add-on battery is removed from the portable computer main body.

Under the state shown in FIG. 7, the add-on battery 4 is pushed forward with respect to the portable computer main body 1 as indicated by an arrow C so as to fit the power connector 33 of the add-on battery 4 to the power connector 13 on the printed board 18 of the portable computer main body 1.

Consequently, the projecting portions 46 of the add-on battery 4 fit into the pair of escape holes 26 for locking on the rear surface 25 of the portable computer main body 1 and restrict the main body 1 in the vertical direction. The pair of lock pawls 41 of the add-on battery 4 are caused to project into the pair of recesses 21 of the portable computer main body 1 by the respective springs 48 and lock the add-on battery 4 to the portable computer main body 1. Accordingly, the add-on battery 4 is restricted back and forth with respect to the portable computer main body 1 and is locked at that position. Further, the pawls 34 and 35 of the add-on battery 4 are caught by the pawls 14 and 15 of the portable computer main body 1, respectively, and firmly fix the vertical position of the add-on battery 4 to the portable computer main body 1. When the power switch (not shown) is turned ON under this state, the add-on battery 4 can be used.

Next, the removing of the add-on battery 4 from the portable computer main body 1 will now be explained. In the same way as in the fitting operation, the main power switch (not shown) of the portable computer main body 1 is first turned OFF, and any other external power source, such as the AC adaptor (not shown), if any, is removed from the personal computer main body 1.

Figure 6:
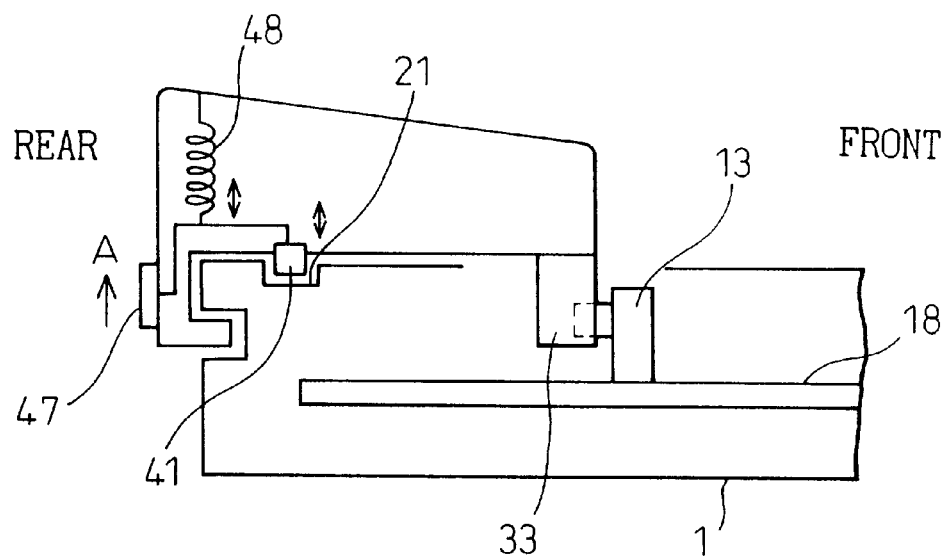
FIG. 6 is a sectional view showing a state where the add-on battery is fitted to the portable computer main body.

Next, as shown in FIG. 6, the pair of lock releasing pawls 47 disposed on the rear surface of the add-on battery 4 are slid in the direction of the arrow A against the springs 48. The pair of lock releasing pawls 47 are interconnected to the pair of lock pawls 41, respectively, and operate integrally with the latter. Therefore, the pair of lock pawls 41 escape from the pair of recesses 21, respectively, of the portable computer main body 1, and the lock is thus released.

Under this state, when the add-on battery 4 is slid in the direction opposite to the direction of the arrow C shown in FIG. 7 with respect to the portable computer main body 1 and is pulled down, the power connector 33 of the add-on battery 4 leave from the power connector of the portable computer main body 1 as shown in FIG. 7, and the pair of projecting portions 46 of the add-on battery 4 also leave the pair of escape holes 26 on the rear surface 25 of the portable computer main body 1.

Therefore, under the state shown in FIG. 7, the add-on battery 4 can be removed from the portable computer main body 1 by pulling the add-on battery 4 from the portable computer main body 1.

Figure 8:
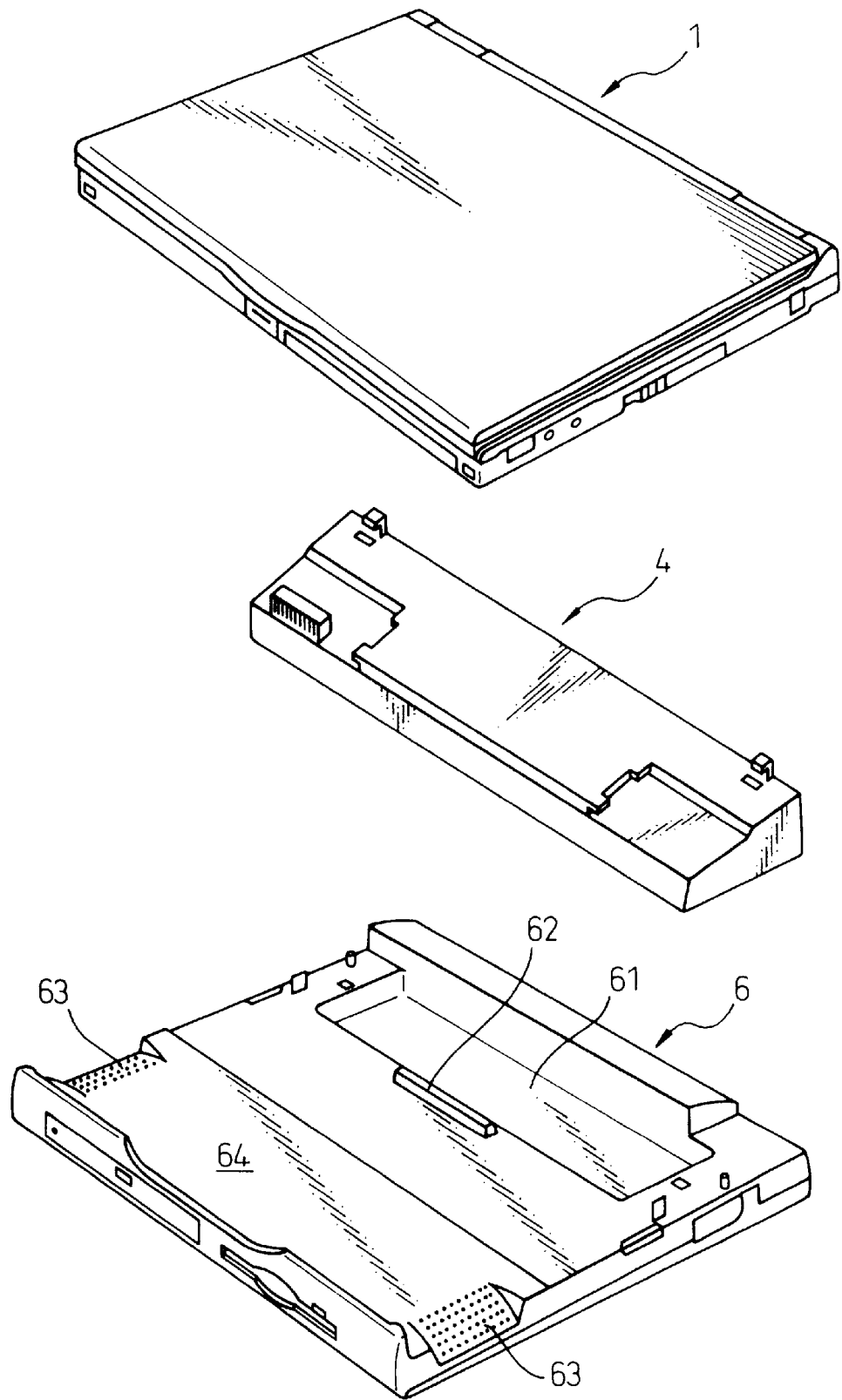
FIG. 8 is a perspective view showing a state where the portable computer main body, the add-on battery and the extended station are not fitted.
Figure 9:
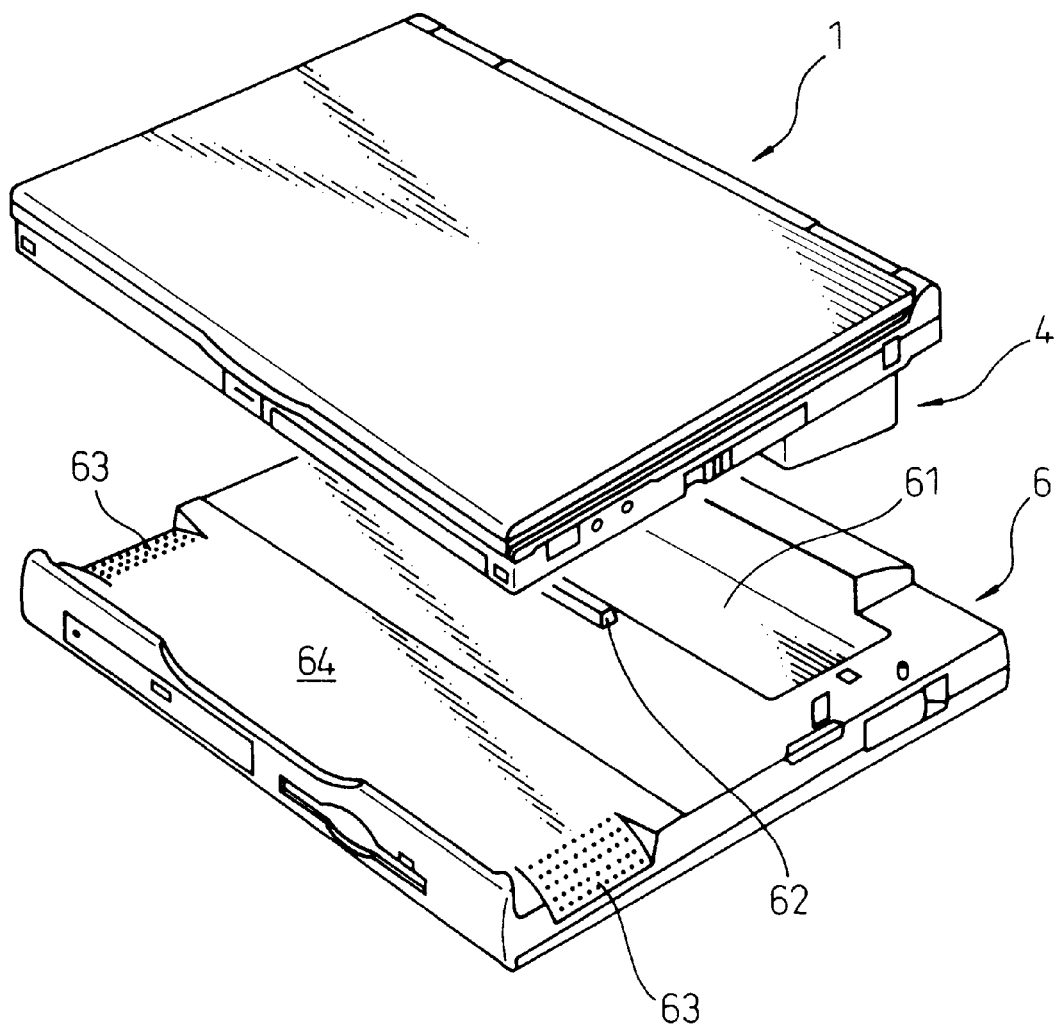
FIG. 9 is a perspective view showing a state where the add-on battery is fitted to the portable computer main body.
Figure 10:
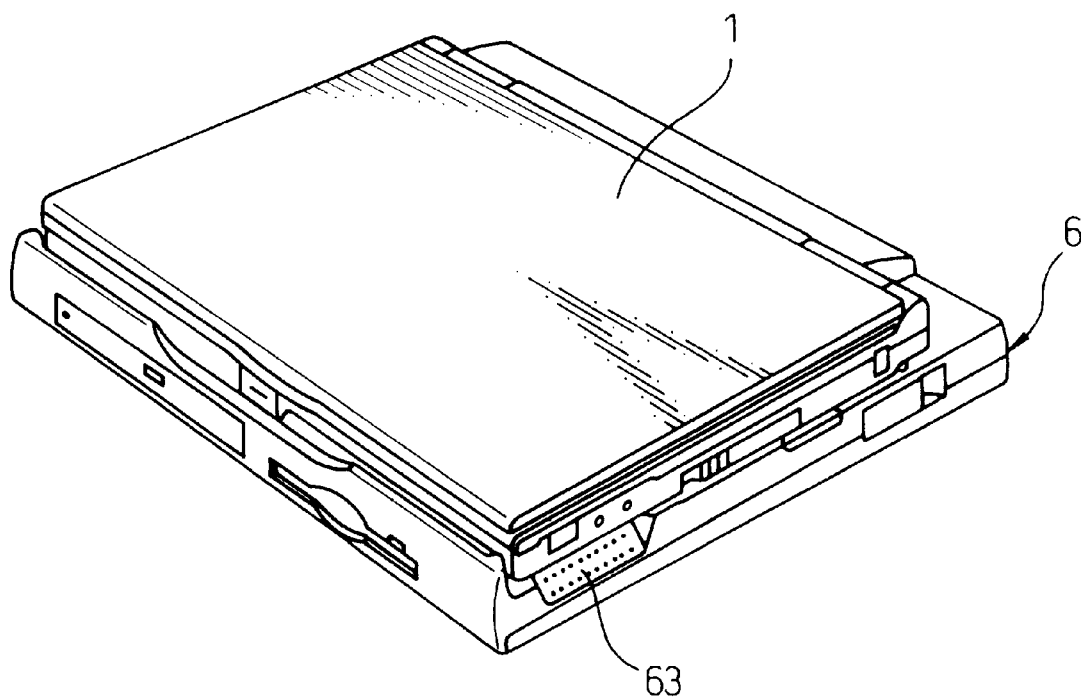
FIG. 10 is a perspective view showing a state where the portable computer main body with the add-on battery is further fitted to the extended station from the state shown in FIG. 9.

FIG. 8 is a perspective view showing the portable computer main body 1, the add-on battery 4 and the extended station 6. FIG. 9 is a perspective view showing the state where the add-on battery 4 is fitted to the portable computer main body 1 and FIG. 10 is a perspective view showing the state where the battery 4 and the computer main body 1 are further fitted to the extended station.

The add-on battery 4 can be fitted to and removed from the portable computer 1 as described above. Furthermore, the present invention makes it possible to mount the portable computer main body 1 to the extended station while the add-on battery 4 is fitted to the computer main body 1. For this purpose, the extended station 6 is provided with a recess 61 for accommodating the add-on battery 4. Since this recess 61 is not a mere opening but is a recess having a bottom portion, a wiring pattern (not shown) such as a printed circuit board for supplying and transmitting power and signals between the front and rear areas of the extended station 6 can be disposed below this recess 61, and effective utilization of the space can be accomplished.

Figure 5:
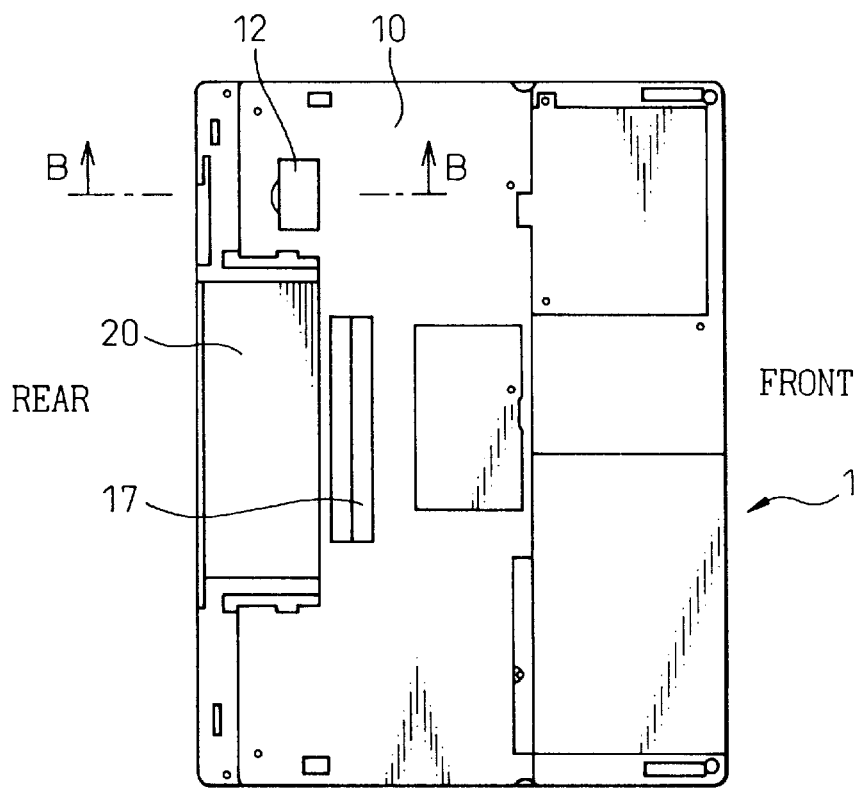
FIG. 5 is a plan view of the back surface of the portable computer.

By the way, when the portable computer main body 1 is fitted to the extended station 6, the connector 17 (see FIG. 5) disposed on the back of the portable computer main body 1 fits to the connector 62 of the extended station 6, and electrical connection is established between them.

Speakers 63 are disposed on both sides of the front portion of the extended station 6. These speakers 63 are inclined downward towards both side edges. Therefore, thin speakers 63 can be effectively disposed. When the portable computer main body 1 is fitted, the back of the main body 1 comes into contact with the upper surface 64 of the extended station 6. However, since the speakers 63 on both sides are inclined, gaps are defined between the portions of the speakers 63 and the back surface of the portable computer main body 1, and the speaker sound can be effectively diffused.

According to the present invention, as described above, when the portable computer is placed on the desk surface, etc, while the add-on battery is fitted thereto, the upper surface of the portable computer main body is inclined in such a fashion that its front portion becomes lower. Therefore, operability becomes excellent. When no add-on battery is fitted, the portable computer main body itself can be constructed into a thin notebook type computer. Even though the add-on battery can be fitted, the portable computer can have a portability equivalent to that of portable computers not having the add-on battery fitting function. Under the state where the add-on battery is fitted, the gap between the back of the portable computer and the desk surface, etc, can be effectively utilized, and a function having a high packaging density can be accomplished.

The add-on battery can easily be fitted to and removed from the portable computer main body and can be firmly fixed to the main body at the time when it is fitted, and its fitting/removing operation can be done stably for a long time.

In a type which is equipped with the extended station, if the portable computer main body having the add-on battery mounted thereto is fitted to this extended station, the add-on battery can be accommodated inside the recess portion of the extended station. Therefore, the space can be effectively utilized as a whole, and an apparatus having a high density can be accomplished. Even though the recess portion exists in the extended station, a printed wiring board, etc, can be disposed below this recess portion, and the internal arrangement inside the extended station can efficiently be made.

It should be understood by those skilled in the art that the foregoing description relates only to preferred embodiments of the disclosed invention, and that various changes and modifications may be made to the invention without departing from the spirit and scope thereof.

What is claimed is:

1. A portable computer provided with a battery add-on capability, said computer comprising:

a portable computer body having an upper surface, a lower surface and a lower front edge, the upper surface having a front edge and the lower surface having a rear region;

mounting means for detachably mounting on the lower surface of said portable computer body an add-on battery having a wedge-shaped portion corresponding to a wedge-like space defined between the rear region of the lower surface of said portable computer body and a surface on which said portable computer body is placed, when said portable computer body is placed to be inclined about said lower front edge of the portable computer body, said mounting means comprising: guide means including a recessed area defined in the lower surface between left and right side areas of the rear region, the recessed area having right and left walls, a front wall, and a rear opening, a pawl fixed at an upper edge of the recessed area and adjacent to a corresponding wall thereof, and a guide groove defined by the pawl and the corresponding wall and along which the add-on battery is first guided toward the lower surface of said portable computer body and then guided forward with respect to said portable computer body, whereby the guide groove catches a corresponding pawl fixed to a bottom edge of a protruding surface portion of the add-on battery, and the wedge-shaped portion of the add-on battery extends rearward from the rear opening of the recessed area and downward from the lower surface of said portable computer body, locking means for automatically locking the add-on battery to the lower surface of said portable computer body when the add-on battery is guided forward with respect to said portable computer body, and releasing means for releasing the locking means to allow the add-on battery to be removed from said portable computer body along the guide groove; and whereby said portable computer body, when it is equipped with the add-on battery, is inclined in such a manner that the upper surface of said portable computer body is lower at a front edge thereof.

2. A portable computer as set forth in claim 1, wherein: the guide groove of the guide means is one of a group of guide grooves arranged in one or more pairs of left and right guide grooves; and the add-on battery has pairs of left and right pawls respectively fitting into the pairs of left and right guide grooves.

3. A portable computer provided with a battery add-on capability, said computer comprising:

a portable computer body having an upper surface, a lower surface and a lower front edge, the upper surface having a front edge and the lower surface having a rear region;

a mounting mechanism to detachably mount on the lower surface of said portable computer body an add-on battery having a wedge-shaped portion and a surface portion protruding therefrom, the wedge-shaped portion and a surface portion protruding therefrom, the wedge-shaped portion corresponding to a wedge-like space defined between the rear region of the lower surface of said portable computer body and a surface on which said portable computer body is placed, when said portable computer body is placed to be inclined about said lower front edge of said portable computer body, said mounting mechanism comprising:

a guide portion including a recessed area defined in the lower surface between left and right side areas of the rear region, the recessed area having right and left walls, a front wall, and a rear opening, a pawl fixed at an upper edge of the recessed area and adjacent to a corresponding wall of the recessed area, and a guide groove defined by the pawl and the corresponding wall and along which the add-on battery is first guided toward the lower surface of said portable computer body and then guided forward with respect to said portable computer body, whereby the guide groove catches a corresponding pawl fixed to a bottom edge of a protruding portion of the add-on battery, and the wedge-shaped portion of the add-on battery extends rearward from the rear opening of the recessed area and downward from the lower surface of said portable computer body, a lock mechanism to lock the add-on battery to the lower surface of said portable computer body when the add-on battery is guided forward with respect to said portable computer body, and a release mechanism to release the lock mechanism, thereby allowing the add-on battery to be removed from said portable computer body along the guide portion; whereby said portable computer body, when equipped with the add-on battery, is inclined in such a manner that the upper surface of said portable computer body is lower at a front edge thereof.

4. A portable computer as set forth in claim 3, wherein; the guide groove of the guide portion is included among left and right guide grooves; and the add-on battery has pairs of left and right pawls respectively fitting into the left and right guide grooves.

5. A portable computer provided with a battery add-on capability, said computer comprising:

a portable computer body having an upper surface, a lower surface and a lower front edge, the upper surface having a front edge and the lower surface having a rear region; and a wedge-shaped add-on battery detachably mountable on the lower surface of said portable computer body;

said portable computer body comprising a guide portion including
- a recessed area defined in the lower surface between left and right side areas of the rear region, the recessed area having right and left walls, a front wall, and a rear opening,
- a pawl fixed at an upper edge of the recessed area adjacent to a corresponding wall of the recessed area, and
- a guide groove defined by the pawl and the corresponding wall and along which said add-on battery is first guided toward the lower surface of said portable computer body and then guided forward with respect to said portable computer body;

said add-on battery comprising:
- a surface portion insertable into the recessed area of said portable computer body and protruding from the wedge-shaped portion,
- a pawl extending from an edge of the protruding area and disposed to catch within the guide groove of the guide portion when the protruding area is inserted in the recessed area of the portable computer body,
- a lock mechanism to lock the add-on battery to the lower surface of said portable computer body when said add-on battery is guided forward with respect to said portable computer body, and
- a release mechanism to release the lock mechanism, thereby allowing said add-on battery to be removed from said portable computer body along the guide portion; and wherein said portable computer body, when equipped with said add-on battery, is inclined in such a manner that the upper surface of said portable computer body is lower at a front edge thereof.

6. A portable computer as set forth in claim 4, wherein:
the guide groove of the guide portion is included among left and right guide grooves; and
said add-on battery has left and right pawls respectively fitting into the left and right guide grooves.

7. A portable computer mountable with an add-battery, said portable computer comprising:
a computer body having a plurality of faces including a bottom face defining therein a pair of L-shaped guide grooves respectively corresponding to a pair of first pawls extending from an upper face of the add-on battery, each guide groove including a first region receiving therein the corresponding first pawl and a second region extending from the first region and receiving therein the first pawl from the first region; and locking means for locking the add-on battery onto said computer body when the add-on battery advances along the bottom face to a predetermined position and the first pawls are respectively received into the second regions;
whereby the add-on battery is mounted to said portable computer by inserting the first pawls into the first regions, and then advancing the add-on battery along the bottom face of said computer body to the predetermined position.

8. A portable computer as set forth in claim 7, wherein said locking means includes a pair of lock pawls biased to project into respective lock recesses when the add-on battery advances to the predetermined position and the first pawls are received into the second regions, whereby the lock pawls restrict movement of the add-on battery to retain the first pawls in the second regions and the first pawls received in the second regions restrict movement of the add-on battery to retain the lock pawls in the lock recesses.

9. A portable computer as set forth in claim 8, wherein the lock pawls project from a face of said computer body and the lock recesses are defined in a face of the add-on battery.

10. A portable computer as set forth in claim 8, wherein the lock pawls project from a face of the add-on battery and the lock recesses are defined in a face of said computer body.

11. A portable computer add-on battery system, comprising:
an add-on battery having a plurality of faces including an upper face, a pair of first pawls extending from the upper face;
a portable computer including a computer body having a plurality of faces including a bottom face, a pair of L-shaped guide grooves being defined in the bottom face and respectively corresponding to the first pawls, each guide groove including a first region receiving the corresponding first pawl therein and a second region extending from the first region and receiving the first pawl therein from the first region; and
locking means for locking said add-on battery onto the computer body when said add-on battery advances along the bottom face to a predetermined position and the first pawls are respectively received into the second regions;
whereby said add-on battery is mounted to said portable computer by inserting the first pawls into the first regions, and then advancing said add-on battery along the bottom face of said computer body to the predetermined position.

12. A portable computer add-on battery system as set forth in claim 11, wherein said locking means includes a pair of lock pawls biased to project into respective lock recesses when said add-on battery advances to the predetermined position and the first pawls are received into the second regions, whereby the lock pawls restrict movement of said add-on battery to retain the first pawls in the second regions and the first pawls received in the guide grooves restrict movement of said add-on battery to retain the lock pawls in the lock recesses.

13. A portable computer add-on battery system as set forth in claim 12, wherein the lock pawls project from a face of the computer body and the lock recesses are defined in a face of said add-on battery.

14. A portable computer add-on battery system as set forth in claim 12, wherein the lock pawls project from a face of said add-on battery and the lock recesses are defined in a face of the computer body.

15. A portable computer add-on battery system, comprising:
a body portion for a portable computer, said body portion having a plurality of faces including an external face defining therein a pair of L-shaped guide grooves each including a first region and a second region extending from the first region; and
a locking system for locking onto the portable computer an add-on battery having a plurality of faces including a mounting face, said locking system including a pair of first pawls extending from the mounting face and respectively corresponding to the guide grooves of said body portion, each first pawl being receivable into the first region of the corresponding guide groove and further receivable into the second region of the corresponding guide groove from the first region;

whereby the add-on battery is mounted to said portable computer by inserting the first pawls into the first regions, and then advancing the add-on battery along the external face of said body portion to the predetermined position.

16. A portable computer add-on battery system as set forth in claim 15, wherein said locking system further includes one or more lock pawls projectable into one or more respective lock recesses when the add-on battery advances along the external face of said body portion to the predetermined position and the first pawls are received into the second regions of the guide grooves, whereby the one or more lock pawls restrict movement of the add-on battery to retain the first pawls in the second regions and the first pawls received in the guide grooves restrict movement of the add-on battery to retain the one or more lock pawls in the one or more lock recesses.

17. A portable computer add-on battery system as set forth in claim 16, wherein the one or more lock pawls project from a face of said body portion and the one or more lock recesses are defined in a face of the add-on battery.

18. A portable computer add-on battery system as set forth in claim 16, wherein the one or more lock pawls project from a face of the add-on battery and the one or more lock recesses are defined in a face of said body portion.

* * * * *

UNITED STATES PATENT AND TRADEMARK OFFICE
CERTIFICATE OF CORRECTION

PATENT NO. : 6,560,100 B1
DATED : May 6, 2003
INVENTOR(S) : Takahiro Shin et al.

It is certified that error appears in the above-identified patent and that said Letters Patent is hereby corrected as shown below:

<u>Column 8,</u>
Line 51, begin a new paragraph with "whereby"

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,560,100 B1 Page 1 of 1
DATED : January 1, 2002
INVENTOR(S) : Takahiro Shin et al.

It is certified that error appears in the above-identified patent and that said Letters Patent is hereby corrected as shown below:

<u>Title page,</u>
Item [56], References Cited, U.S. PATENT DOCUMENTS, please add the following:
-- 5,293,300   03/1994   Leung
5,768,100   06/1998   Barrus et al.
5,986,991   11/1999   Kawahara et al.
6,078,496   06/2000   Oguchi et al. --

FOREIGN PATENT DOCUMENTS, please add the following:
-- 4-136721   10/1992   Japan
4-115753   10/1992   Japan
9-190241   07/1997   Japan
0 448 053   09/1991   European Patent Office
4-108218   09/1992   Japan
5-23231   03/1993   Japan
5-40917   06/1993   Japan
5-274058   10/1993   Japan
6-35569   02/1994   Japan
7-121518   05/1995   Japan
7-84689   03/1995   Japan --

Signed and Sealed this

Twenty-seventh Day of January, 2004

JON W. DUDAS
*Acting Director of the United States Patent and Trademark Office*